G. E. ECKERT.
CABLE CLAMP.
APPLICATION FILED OCT. 19, 1920.
1,378,667.
Patented May 17, 1921.
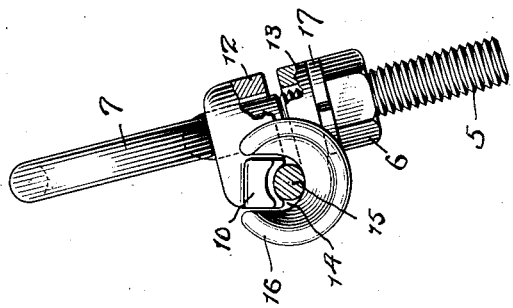
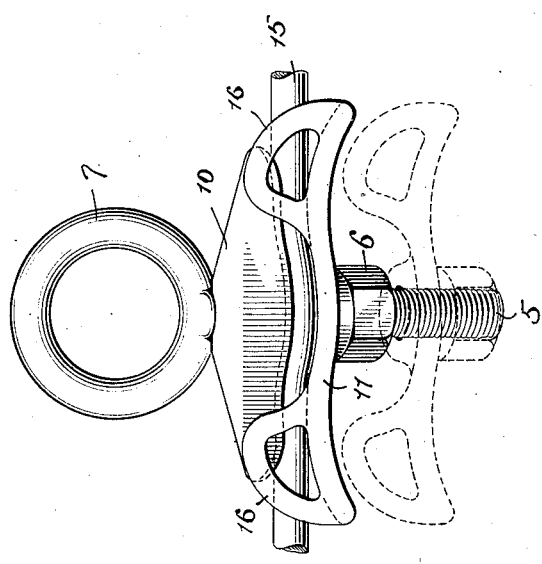
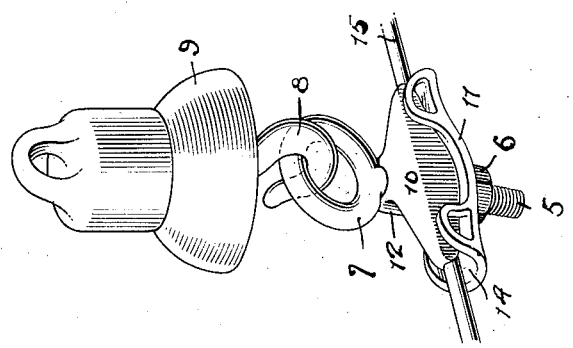
INVENTOR
GRANDON E. ECKERT
BY
ATTORNEYS

UNITED STATES PATENT OFFICE.

GRANDON E. ECKERT, OF EAST LIVERPOOL, OHIO, ASSIGNOR TO THE R. THOMAS & SONS CO., OF EAST LIVERPOOL, OHIO, A CORPORATION OF OHIO.

CABLE-CLAMP.

1,378,667.  Specification of Letters Patent.  Patented May 17, 1921.

Application filed October 19, 1920. Serial No. 418,121.

*To all whom it may concern:*

Be it known that I, GRANDON E. ECKERT, a citizen of the United States of America, residing at East Liverpool, in the county of Columbiana and State of Ohio, have invented certain new and useful Improvements in Cable-Clamps, of which the following is a specification.

My invention relates to cable clamps, and particularly to a clamp for supporting electric power cables from suspension insulators or the like. Among the objects of my invention may be mentioned simplicity of design, strength of construction, and the use of a standard bolt for the element of the structure on which strains are imposed. Other features of value will be hereinafter described or recognized from inspection of the accompanying drawings, in which—

Figure 1 is a perspective view of a clamp in which my invention is embodied in one form, the clamp being shown in association with portion of a cable and a suspension insulator;

Fig. 2 is a side elevation of the clamp drawn to an enlarged scale; and

Fig. 3 is a view at right angles to Fig. 2, portions of certain of the clamping elements being broken away.

The underlying thought of the present invention is to provide a cable clamp in which the stresses are taken by a standard iron or steel bolt, with which are associated independent clamping elements for engaging the cable, as distinguished from the usual suspension clamp, which comprises throughout such variable materials as gray iron or malleable iron, the strength of which is often insufficient to meet the demands placed upon the clamp under service conditions. As here indicated, the present clamp is built up around the bolt 5, threaded at its lower end to receive the nut 6, and provided at its upper end with any suitable means, such as an eye 7 for engaging the suspension element 8 of the insulator 9. Supported freely on the bolt are the upper and lower clamping plates 10 and 11, each provided with a hub 12, 13, pierced to slide freely over the bolt shank. Both clamping plates are channeled on their juxtaposed faces to afford a cableway 14, preferably undulatory to slightly crimp, and thus clamp the cable 15 between them when the clamp is tightened. Guide wings 16 at the opposite ends of the lower clamping plate 11 retain the cable 15 therein during the preliminary stringing of the cable through the clamp. It will be noted from Fig. 3 that the position of the clamping plates 10 and 11, with respect to their hubs 12 and 13, is such that the vertical axis through the cableway in suspended position of the clamp, lies at an angle to the axis of the hubs 12 and 13 and of the bolt 5.

On installation the bolt 7 is suspended beneath the insulator 9 with the nut 6 screwed down on the lower portion of the bolt shank, and the two clamping plates 10 and 11 freely separable on the latter. The cable 15 having been laid on the lower plate 11 between the guide wings 16, is then drawn up to proper tension, sag, etc., and the clamp then tightened by screwing up the nut 6, until the cable is firmly gripped between the plates 10 and 11. The supporting stresses are now taken by the clamp, and in the present construction they are imposed upon the standard bolt 5. It is obvious that by making the diameter of the hole in the hubs 12 and 13 of sufficient width, standard bolts may be used of any suitable diameter to meet the needs of the required installation, and that a separate clamp fitting to suit each installation is not necessary. Moreover, bolts of the present type may be readily obtained in most localities as standard stock, thus necessitating the shipment with the insulators of only the clamping plates 10 and 11.

It will be understood, of course, that the head 7 of the bolt may be of any type, such as a hook, an eye, a U clevis, straight machine bolt, or one of any other suitable design for establishing connection with the insulator. It may also be desirable in some instances, to use a lock washer 17 to hold the nut 6 in clamping position. In any event, the head 7 of the bolt affords an abutment, between which and the nut 6 the plates 10 and 11 are confined in clamping position.

Various modifications in detail of design and arrangement of parts will doubtless be clear to those skilled in the art without departing, however, from what I claim as my invention.

I claim—

1. A suspension clamp for cables, comprising a bolt having a suspension head and threaded shank, complementary cable clamping members having lateral hubs through which said shank freely passes, in combination with a nut screwing on said shank and serving to hold said clamping members in engagement with the cable.

2. A suspension clamp, comprising a bolt having a suspension head and threaded shank, a nut screwing on the shank, and a pair of complementary cable clamping members freely mounted on said shank between the nut and bolt head and having in their mid-areas laterally extending hubs pierced to permit the free passage of the bolt shank therethrough.

3. As elements of a suspension clamp, a pair of complementary clamping members shaped on their juxtaposed faces to afford a cableway, said members having laterally extending hubs pierced to freely receive the shank of a suspension bolt.

4. As elements of a suspension clamp, a pair of complementary clamping members shaped on their juxtaposed faces to afford a cableway, said members having hubs pierced to freely receive the shank of a suspension bolt, the axes of the holes in said hubs being inclined to the axial plane of the cableway, substantially as described.

5. A suspension clamp, comprising a suspension bolt with threaded shank, a pair of complementary cable clamping members, the lower of which is longitudinally channeled to afford a cableway, and provided with upwardly extending side guide wings for holding the cable in said way, lateral projections at the mid-areas of said clamping members arranged to one side of said way and pierced to permit the passage of the bolt therethrough, and a nut on said bolt shank for drawing said clamping members together.

6. A suspension clamp, comprising a suspension bolt with threaded shank, a pair of complementary cable clamping members, the lower of which is longitudinally channeled to afford a cableway, and provided with upwardly extending side guide wings for holding the cable in said way, lateral projections at the mid-areas of said clamping members arranged to one side of said way and pierced to permit the passage of the bolt therethrough, and a nut on said bolt shank for drawing said clamping members together, the axes of the bolt holes in said clamping members being inclined to the cable suspension plane.

In testimony whereof I have signed my name to this specification.

GRANDON E. ECKERT.